(12) United States Patent
Stubbs

(10) Patent No.: US 11,678,611 B2
(45) Date of Patent: Jun. 20, 2023

(54) THORN EXTRACTOR APPARATUS

(71) Applicant: Stacy Stubbs, Colorado City, AZ (US)

(72) Inventor: Stacy Stubbs, Colorado City, AZ (US)

(73) Assignee: Burz, LLC, Colorado City, AZ (US)

( * ) Notice: Subject to any disclaimer, the term of this patent is extended or adjusted under 35 U.S.C. 154(b) by 526 days.

(21) Appl. No.: 16/944,374

(22) Filed: Jul. 31, 2020

(65) Prior Publication Data

US 2021/0029885 A1   Feb. 4, 2021

Related U.S. Application Data

(60) Provisional application No. 62/882,262, filed on Aug. 2, 2019.

(51) Int. Cl.
*A01G 3/00* (2006.01)
*E01H 15/00* (2006.01)

(52) U.S. Cl.
CPC .............. *A01G 3/00* (2013.01); *E01H 15/00* (2013.01)

(58) Field of Classification Search
CPC ...... E01H 15/00; A01G 2005/005; A01G 3/00
See application file for complete search history.

(56) References Cited

U.S. PATENT DOCUMENTS

| | | | |
|---|---|---|---|
| 5,025,620 A * | 6/1991 | Dudley | A01D 51/002 414/440 |
| 8,449,683 B2 | 5/2013 | Vice | |
| 8,752,233 B2 | 6/2014 | Vice | |
| 9,565,799 B1 | 2/2017 | Finch | |
| 9,844,182 B1 * | 12/2017 | Vanosdall | A01D 51/00 |
| 2012/0145190 A1 * | 6/2012 | Vice | A01D 51/00 15/230 |
| 2013/0239350 A1 * | 9/2013 | Vice | A01D 51/00 15/230 |
| 2015/0208588 A1 * | 7/2015 | Cady | A01G 20/43 15/98 |
| 2016/0230361 A1 * | 8/2016 | Prew | E01H 15/00 |
| 2017/0164557 A1 * | 6/2017 | Harold | A01D 46/02 |

* cited by examiner

*Primary Examiner* — Monica L Perry
(74) *Attorney, Agent, or Firm* — Gurr Brande & Spendlove, PLLC; Robert A. Gurr

(57) ABSTRACT

The thorn extractor apparatus has a frame, a roller, a screen that surrounds the roller and a screen roller, and a removably attachable collection bin for receiving the thorny seeds. The roller and screen work together to pick up and convey the thorny seeds to the removably attachable collection bin to be discarded.

15 Claims, 6 Drawing Sheets

THORN EXTRACTOR APPARATUS

CROSS-REFERENCE TO RELATED APPLICATIONS

This application claims the benefit of U.S. Provisional Application Ser. No. 62/882,262, filed on Aug. 2, 2019, which is incorporated herein by reference.

TECHNICAL FIELD

The present disclosure relates to a thorn removal apparatus. More particularly, the present disclosure relates to a roller apparatus for removal and collection of thorns.

BACKGROUND

*Tribulus terrestris*, commonly referred to as goathead weeds or puncture weeds/vines, is a noxious weed that is aggressive and difficult to control. Goathead weeds are found in warm climates throughout the world. For example, Goathead weeds may be found in Africa, North America, and Australia. Goathead weeds have long vines that produce many thorny seeds, which can be dormant for years before a goathead weed emerges. The thorny seeds are known to cause pain to any person or animal that comes into contact with them. They are also notorious for puncturing bike tires and soles of shoes, causing frustration for many individuals.

These thorny seeds are often distributed to other locations by puncturing the skin of humans and animals. This distribution process is effective and often leads to many yards and fields becoming overwhelmed with the thorny seeds. Further, the thorny seeds are small and hard to pick up because of their sharp thorns. Due to the goathead weeds having a difficult and aggressive nature, many yards, fields, and native plant species are consumed each year. In fact, many individuals find that their efforts of removing the goathead weed from their land is futile.

Many methods of removing goat head weeds are inefficient. Some of these methods include burning the weeds with propane, spraying to inhibit new growth, or using various approaches to collect thorns. Specifically, when burning the goathead weeds, they must be burned while still alive and before they are dry. If not, the seeds may be dispersed leading to more goathead weed growth. Even burning the goathead weeds when they are alive may still not fully remove the issue. The previously described methods take a lot of time, and even if persistent in the removal process, may not lead to any desired results.

When using any approach to remove the goathead weeds, there still remains the issue of the thorny seeds that have been dispersed on the ground. Spray and burning may kill the weed, but may not kill all the seeds, which can lead to future growth of the goathead weed. Typically, by the time goathead weed growth is readdressed after burning or spraying, there are more dried out thorny seeds on the ground. To prevent future goathead weed growth, it is essential that seeds are not dispersed and that any dried-out thorny seeds are collected and discarded. As previously discussed, the seeds are small, sharp, and difficult to pick up by hand. There have been several attempts to create devices that are capable of removing numerous seeds. However, these devices are expensive, not widely available for individual use, and have many shortcomings.

Accordingly, there remains a need for an apparatus that removes and collects thorns in an easy, efficient, and inexpensive manner. The present disclosure seeks to solve these and other problems.

SUMMARY OF EXAMPLE EMBODIMENTS

In one embodiment, the thorn extractor apparatus comprises a frame, a roller, a screen that surrounds the roller, and a removably attachable collection bin for receiving the thorny seeds. The frame may comprise a plurality of frame couplers, a plurality of side members, and a plurality of horizontal beams.

In one embodiment, a method of using a thorn extractor apparatus comprises a user holding a handle beam and pushing the thorn extractor apparatus to collect thorny seeds. In particular, as a user pushes the thorn extractor apparatus, a roller and a screen turns. The roller makes contact with and secures the thorny seeds. The user then continues to push the thorn extractor apparatus. When the roller turns with the thorny seeds, the screen detaches the thorny seeds as it lifts off and moves away from the roller towards the removably attachable collection bin. The thorny seeds are then deposited into the removably attachable collection bin as the screen continues to move. The roller continues to pick up thorny seeds and the process continues until the removably attachable collection bin is filled. With the collection bin being filled, the user can detach the removably attachable collection bin and discard the thorny seeds.

DETAILED DESCRIPTION OF EXAMPLE EMBODIMENTS

Figure 1:
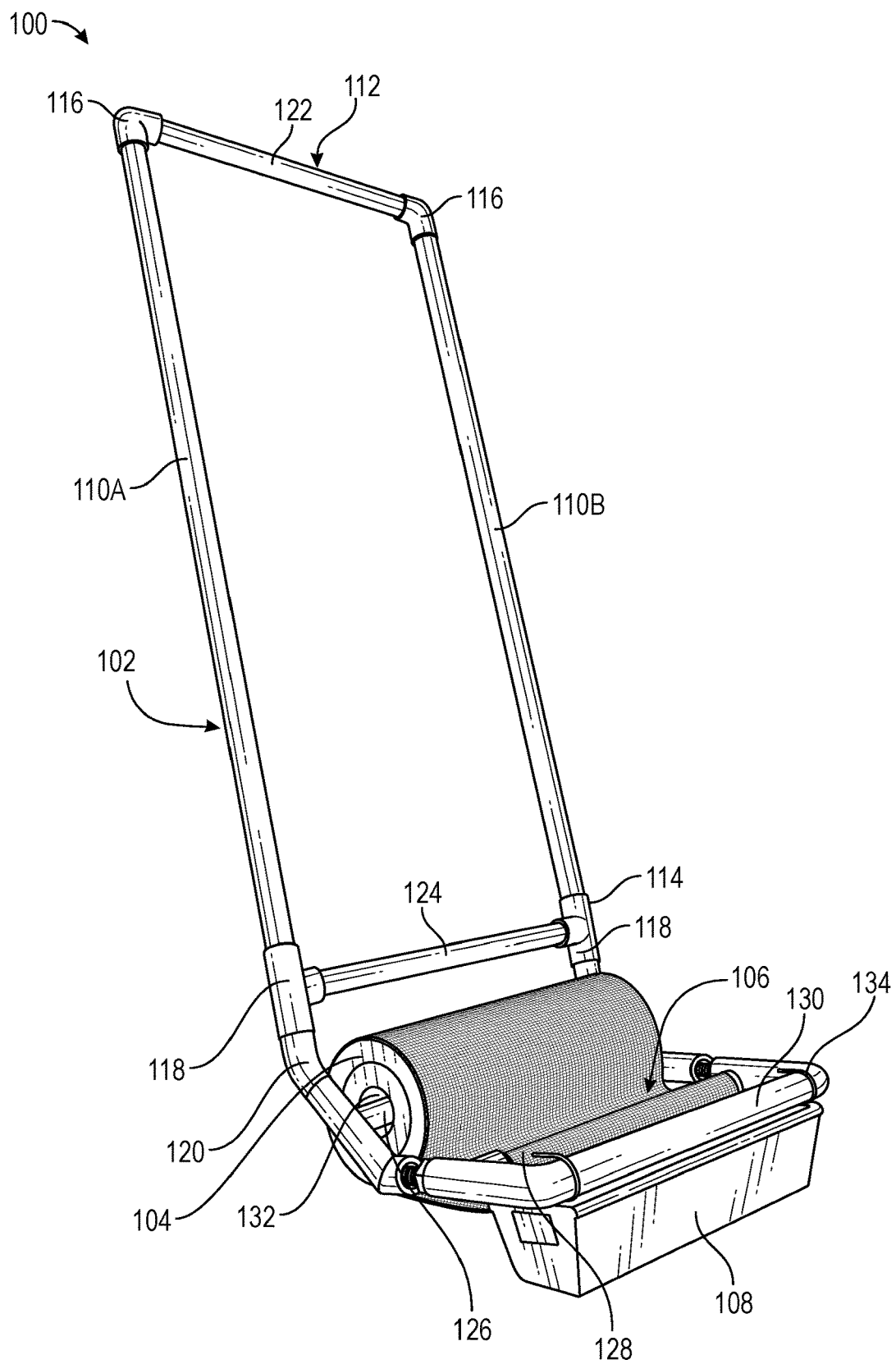
FIG. 1 illustrates a front, left perspective view of a thorn extractor apparatus.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there remains a need for an apparatus that removes and collects thorns in an easy, efficient, and inexpensive manner. The present disclosure seeks to solve these and other problems.

Thorny seeds, especially goathead seeds, are prevalent and often can consume a pristine tract of land. Thorny seeds not only damage yards and fields, but can also cause physical pain to humans and animals. There have been many attempts at removing thorny seeds, with many of these attempts having shortcomings. For example, individuals often burn goathead weeds. However, burning weeds does not always destroy the thorny seeds. In fact, many seeds may survive the heat produced by the fire and because these thorny seeds are not removed from the land, additional goathead weeds may grow.

In contrast, the thorn extractor apparatus described herein assists a user in removing the thorny seeds from their land. Generally, the thorn extractor apparatus may comprise a frame with a roller that contacts the ground to pick up and remove thorny seeds that are spread across a tract of land. The thorny seeds are deposited into a removably attachable collection bin via a screen. It will be appreciated that the thorn extractor apparatus allows a user to permanently remove thorny seeds from any tract of land, thereby preventing future weed growth.

Figure 2:
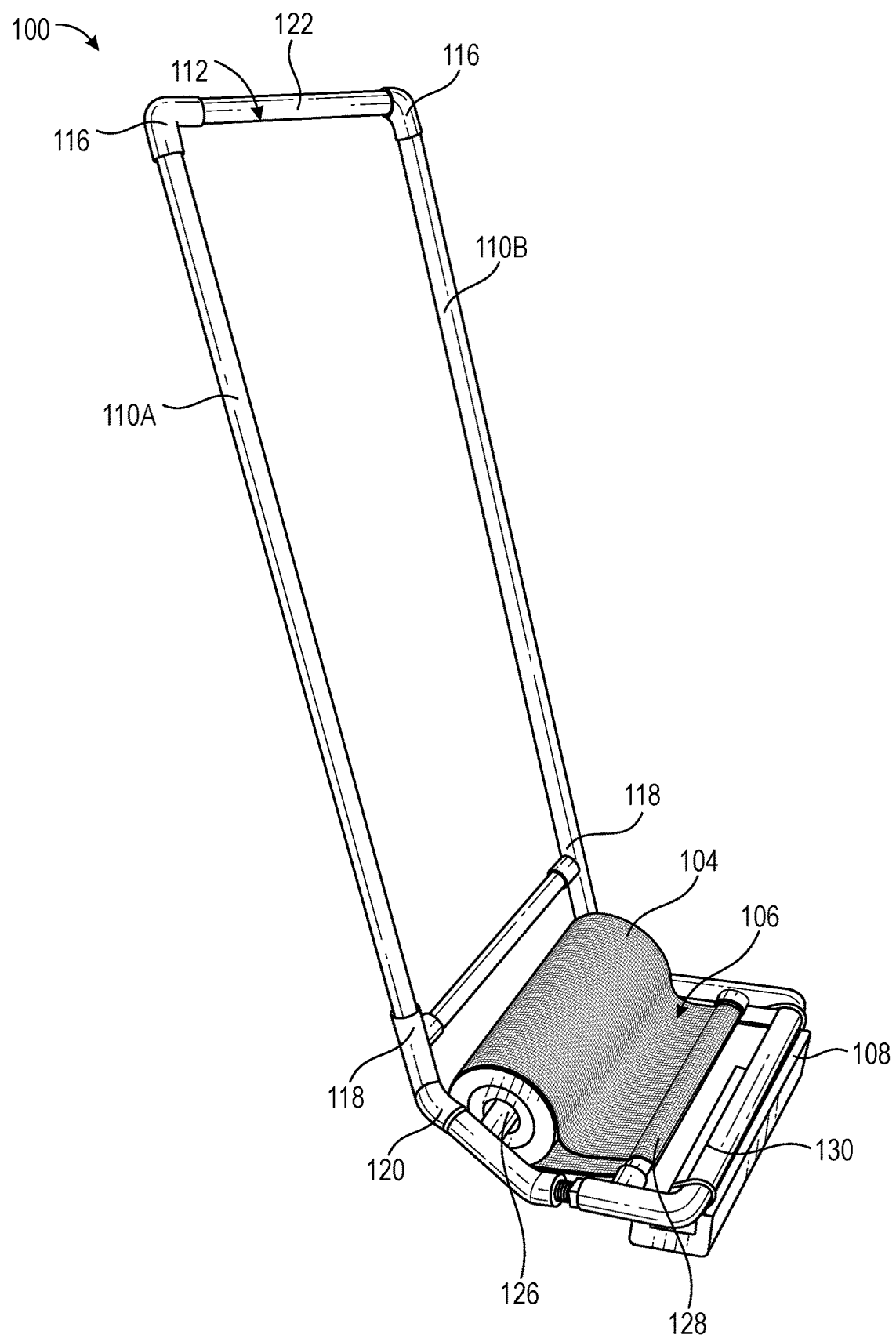
FIG. 2 illustrates a left, top perspective view of a thorn extractor apparatus.
Figure 3:
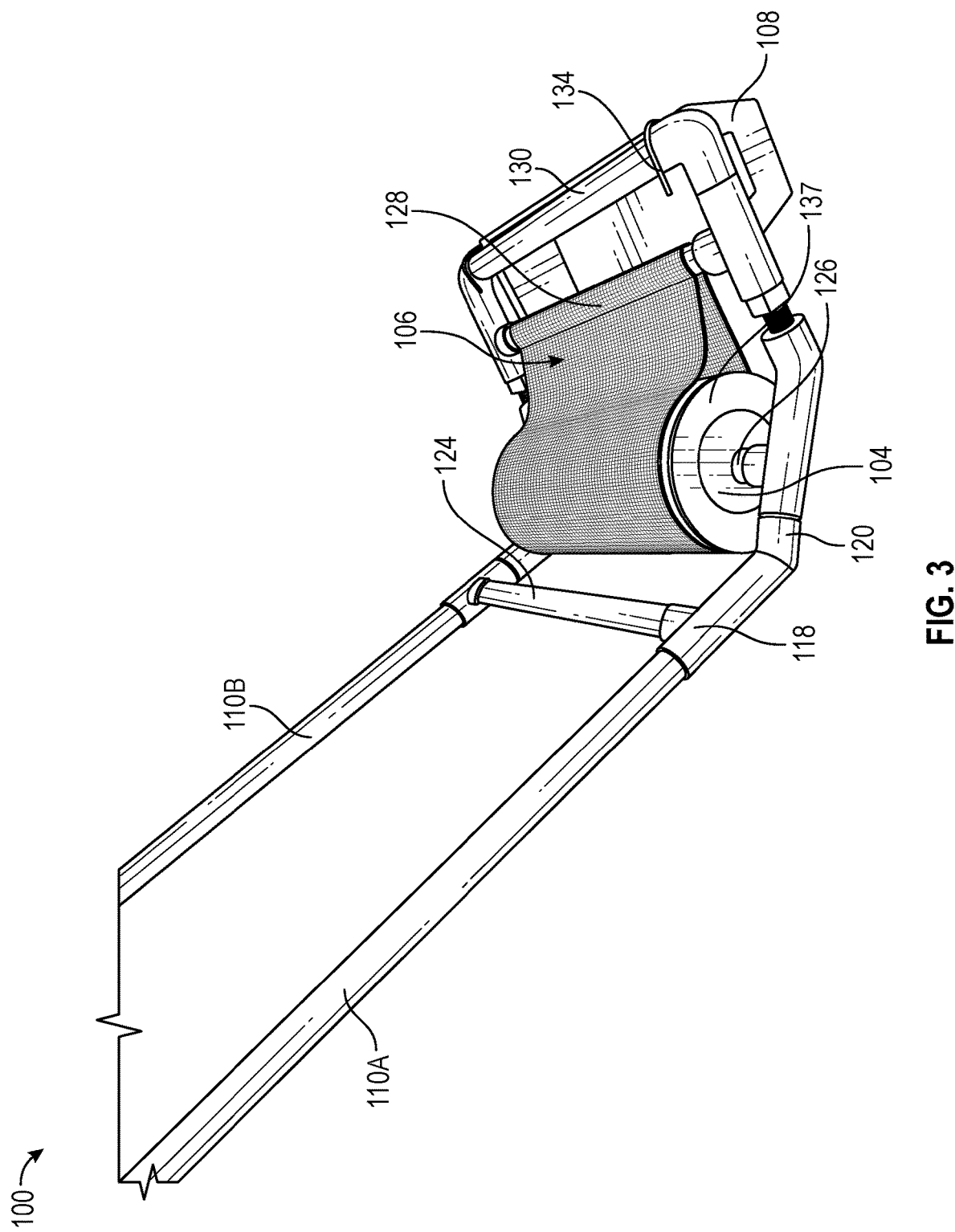
FIG. 3 illustrates a detailed, left side perspective view of a thorn extractor apparatus.

In one embodiment, as shown in FIGS. 1-3, the thorn extractor apparatus 100 comprises a frame 102, a roller 104, a screen 106 that surrounds the roller 104, and a removably attachable collection bin 108 for receiving the thorny seeds. The frame 102 may be polyvinyl chloride (PVC). However, other materials may be used, such as steel, aluminum, wood, etc. The frame 102 may comprise a first side member 110A and a second side member 110B; however, it may be understood that the frame 102 could comprise one or a plurality of side members. For example, one member could form a "T" handle coupled to a lower frame member, such as beam 124. The frame 102 also comprises one or more horizontal beams 112 that couple the side members 110A, 110B together, adding structure and strength to the thorn extractor apparatus 100. The horizontal beam 112 may also function as handle 122. The frame 102 may further comprise one or more frame couplers 114. For example, the frame couplers 114 may comprise corner couplers 116, beam couplers 118, and angled couplers 120. Although shown and described as several components coupled together, it will be appreciated that the frame may be formed from a single, continuous piece of material, such as aluminum, plastic, or other shapeable materials. Additionally, the side members 110A, 110B may be adjustable (e.g., telescopic) to adjust for the height of a user.

The thorn extractor apparatus may comprise a plurality of horizontal beams or members, including handle beam 122, a structure beam 124, a roller beam 126, a screen beam 128, and a collection bin beam 130. The handle beam 122 is positioned at a top portion of the thorn extractor apparatus 100, while the structure beam 124, roller beam 126, screen beam 128, and collection bin beam 130 are positioned at a bottom portion of the thorn extractor apparatus 100. The roller beam 126 is inserted through a roller aperture 132 on the roller 104.

The roller 104 may be made of a hard-inner material, such as plastic, with a soft outer material 137, such as neoprene, that can be removably attachable. However, other rollers may be used, such as rubber, soft plastic, foam, or any other material that can be punctured by a thorny seed. In one embodiment, the roller 104 may be a hard, hollow drum that may be filled with a liquid or a solid to increase weight, leading to more pressure on the ground surface and a higher likelihood of retrieving the dispersed thorny seeds. The roller 104 may be of varying sizes, such as a small diameter or a large diameter. Further, the roller 104 collects the thorny seeds from the ground due to the soft material on the roller 104, allowing them to be deposited into the removably attachable collection bin 108 via the screen 106.

Figure 4:
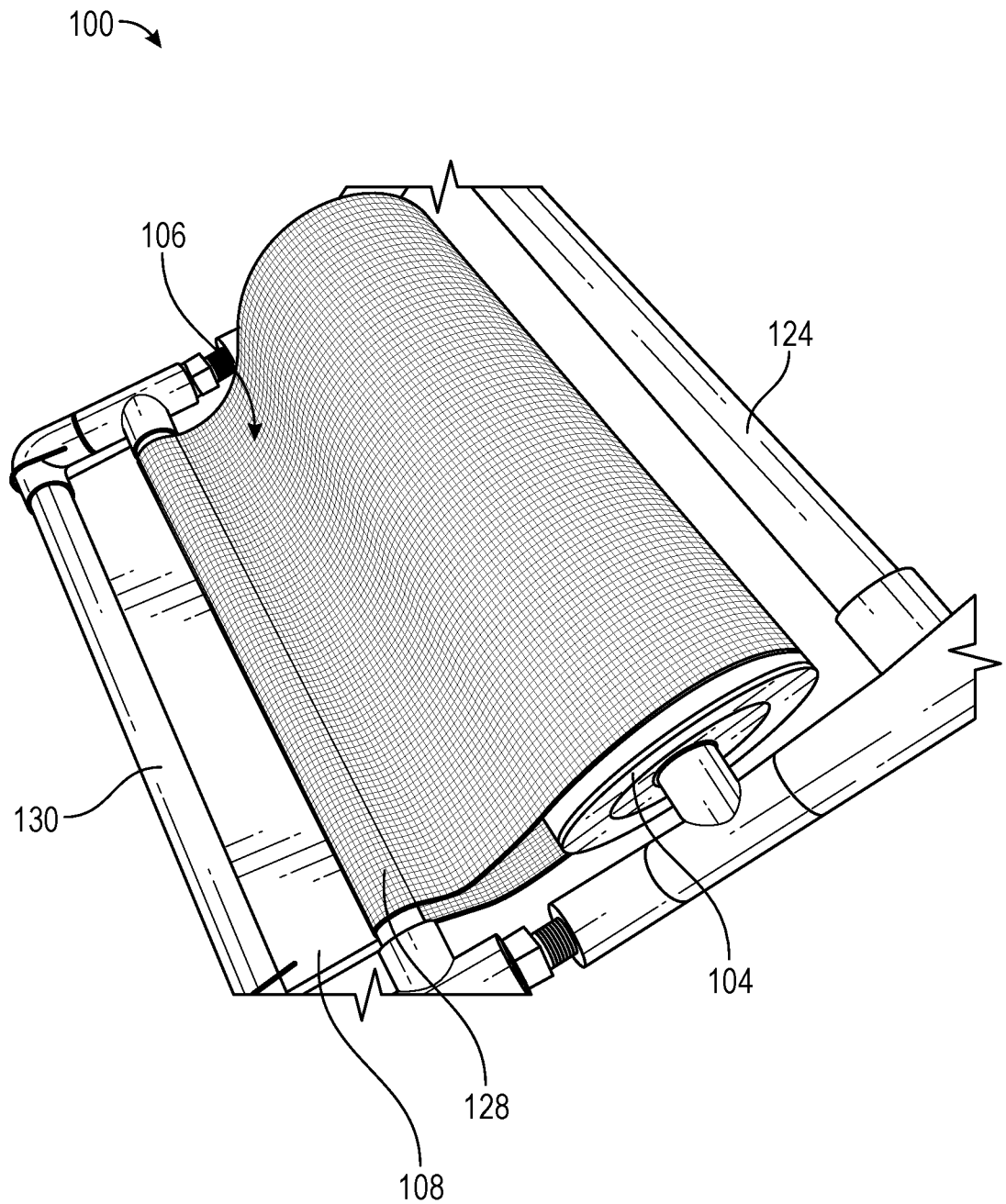
FIG. 4 illustrates a top, right perspective view of a roller, screen, and removably attachable collection bin of a thorn extractor apparatus.

Referring to FIG. 4, the screen 106 may be window screen. Alternatively, the screen 106 may be mesh or any thin material that can be punctured so as to allow thorny seeds to penetrate the roller 104. The screen 106 may be positioned to encompass the screen beam 128 and the roller 104. The screen 106 rotates with the roller 104, removing the thorny seeds, in a conveyor belt fashion, from the roller 104. In operation, the thorn extractor apparatus 100 picks up thorny seeds when the seeds couple to the roller 104. When the thorny seeds need to be removed, the roller 104 continues to rotate with the screen 106. As the screen 106 moves around the roller 104, the screen 106 leaves the roller 104 to pass over the screen beam 128, which lifts the seeds out and off of the roller 104, ultimately being deposited in the collection bin (e.g., falling in or being scraped off on the edge of the bin 108 as the screen 106 returns to the roller 104). It will be appreciated that the thorn extractor apparatus 100, with the screen 104, removes all of the thorny seeds that attach to the roller 106. The screen 104 is able to lift all thorny seeds that have penetrated the roller 106 and deposit them into the removably attachable collection bin 108.

Figure 5:
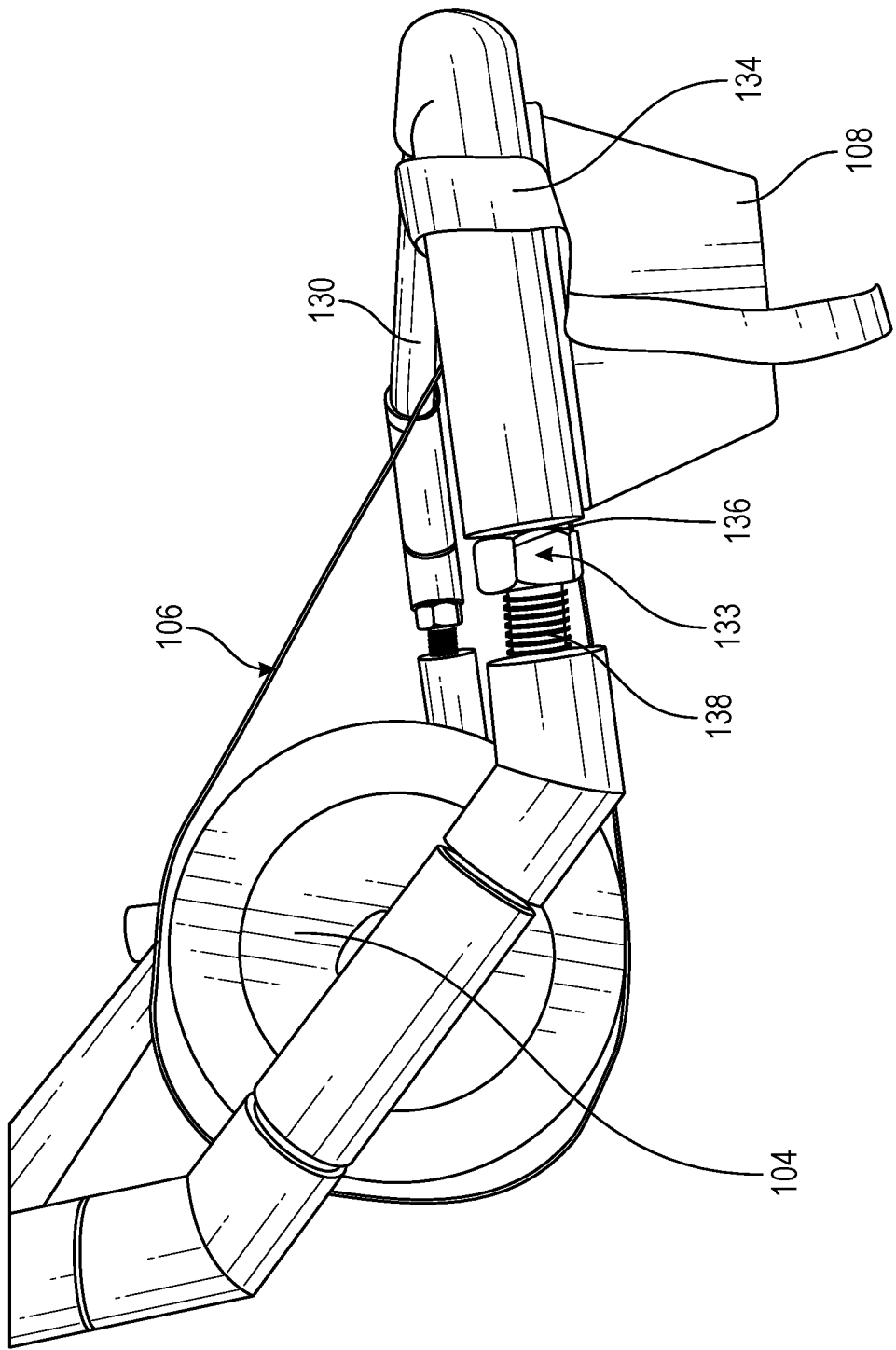
FIG. 5 illustrates a detailed, left side perspective view of a roller, screen, and tensioner of a thorn extractor apparatus.
Figure 6:
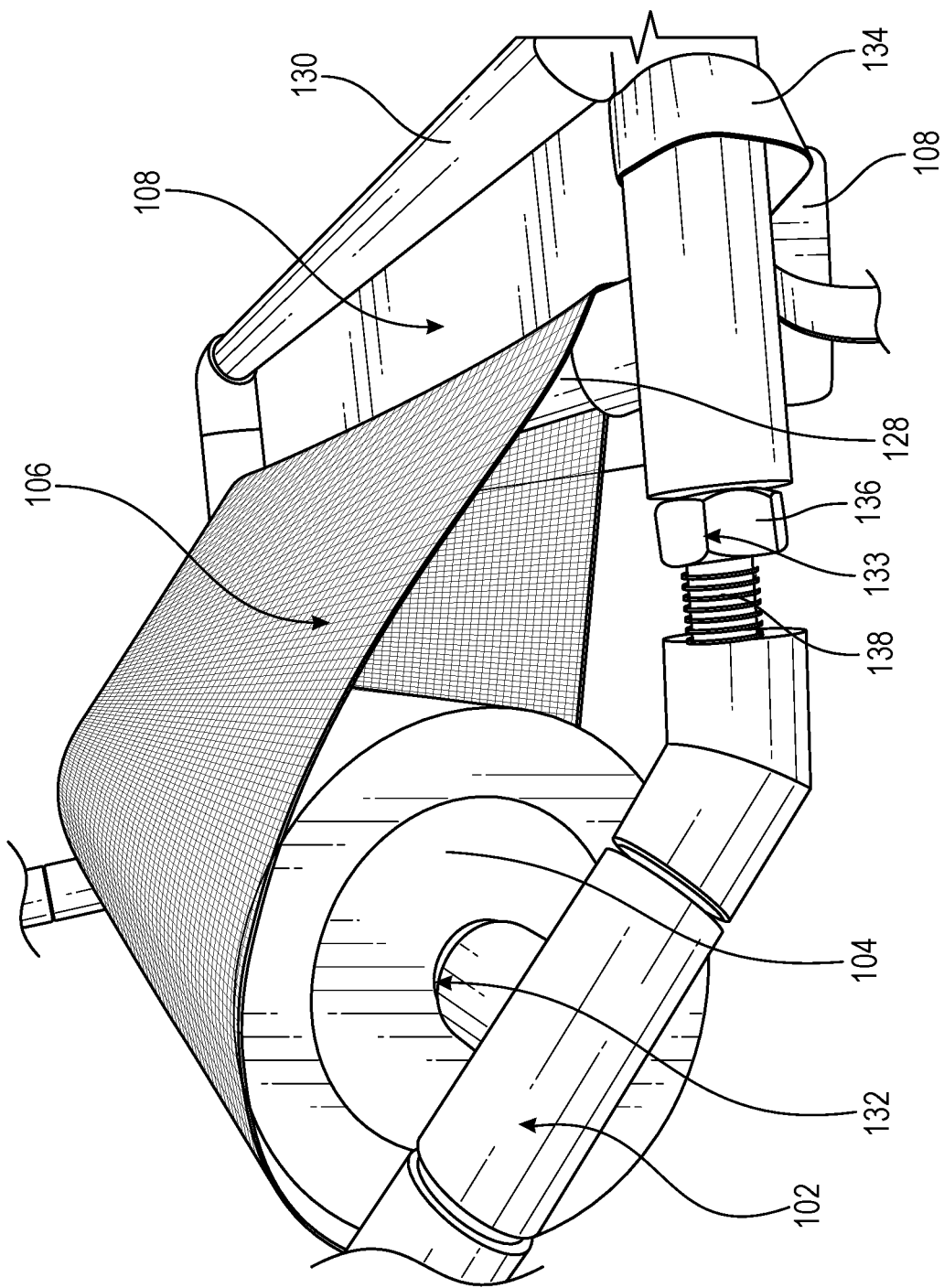
FIG. 6 illustrates a detailed, left side perspective view of a roller, screen, tensioner, and removably attachable collection bin of a thorn extractor apparatus.

As shown in FIGS. 5-6, a tensioner 133 may increase the tension or tightness of the screen. The tensioner 133 may function by utilizing a nut 136 and bolt 138. In other words, as the nut 136 is moved along the bolt 138, the screen beam 128 and the collection bin beam 130 move relative to the movement of the nut 136 and bolt 138. If the nut 136 allows more of the bolt 138 to be exposed (i.e., extended), then more tension is placed on the screen 106. On the other hand, if less of the bolt 138 is exposed, then less tension is placed on the screen 106. While the tensioner 133 shown utilizes a nut and bolt, it will be appreciated that other tensioners may be used, such as telescoping poles with push buttons, twist and lock, or other configuration.

The removably attachable collection bin 108 may be rectangular and plastic.

Alternatively, it may be a bag or any other bin for collecting and storing. The removably attachable collection bin 108 may be of the same length as the roller 104 so as to collect all the thorny seeds picked up by the roller 104. The removably attachable collection bin 108 comprises a securement mechanism 134, wherein the securement mechanism 134 comprises, for example, hook and loop straps (shown in FIGS. 5-6) so as to be couplable to the collection bin beam 130. It will be appreciated that other securement mechanisms may be used, such as wire hooks (shown in FIG. 3), bolts and nuts, hinges, locking pins, etc. It will further be appreciated that the securement mechanism 134 can quickly be attached and released, which makes discarding the thorny seeds simple. Further, the removably attachable collection bin 108 is positioned beneath the screen beam 128 to be able to receive the thorny seeds from the screen 106. The roller 104 may also be removable by disassembling the components of the frame 102.

In one embodiment, a method of using a thorn extractor apparatus 100 comprises a user holding the handle beam 122 and pushing the thorn extractor apparatus 100. As a user pushes the thorn extractor apparatus 100, a roller 104 and a screen 106 turns, making contact with, and securing, thorny seeds in the roller (by at least a portion of the thorn passing through the screen 106 and penetrating the soft exterior of the roller 104). The user then continues to push the thorn extractor apparatus 100. When the roller 104 turns with the thorny seeds, the screen 106 detaches the thorny seeds as it lifts off and moves away from the roller 104 towards the removably attachable collection bin 108. The thorny seeds are then dropped into the removably attachable collection bin 108 as the screen 106 continues to move, or are scraped off on the edge of the collection bin 108. The roller 104 continues to pick up thorny seeds and the process continues until the removably attachable collection bin 108 is filled. Then the user can detach the removably attachable collection bin 108 and discard the thorny seeds.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A thorn extractor apparatus comprising:
   a frame;
   a roller coupled to the frame via a roller beam to retrieve thorny seeds;
   a screen surrounding the roller and extending around a screen beam;
   wherein as the roller rotates, the screen rotates therewith, lifting thorns from the roller and depositing them in a collection bin as the screen rotates around the screen beam.

2. The thorn extractor apparatus of claim 1, wherein the frame comprises a first side member and a second side member.

3. The thorn extractor apparatus of claim 1, wherein the frame comprises at least one horizontal beam.

4. The thorn extractor apparatus of claim 1, further comprising a handle beam, a structure beam, and a roller beam.

5. The thorn extractor apparatus of claim 1, wherein the roller comprises a hard, hollow drum.

6. The thorn extractor apparatus of claim 5, wherein the hard, hollow drum comprises a removably attachable soft outer material.

7. The thorn extractor apparatus of claim 6, wherein the soft outer material comprises neoprene.

8. The thorn extractor apparatus of claim 1, wherein the removably attachable collection bin comprises a securement mechanism.

9. The thorn extractor apparatus of claim 8, wherein the securement mechanism comprises hook and loop.

10. The thorn extractor apparatus of claim 8, wherein the securement mechanism comprises wire hooks.

11. A thorn extractor apparatus comprising:
    a frame comprising a first side member and a second side member, a handle beam, a roller beam, and a screen beam;
    a roller couplable to the roller beam to retrieve thorny seeds;
    a screen surrounding the roller and the roller beam, the screen extending around the screen beam;
    a removably attachable collection bin;
    a tensioner to maintain tension on the screen;
    wherein as the roller rotates, the screen rotates therewith, lifting thorns from the roller and depositing them in a collection bin as the screen rotates around the screen beam.

12. The thorn extractor apparatus of claim 11, wherein the roller comprises a foam material.

13. The thorn extractor apparatus of claim 11, wherein the roller comprises a hard, hollow drum.

14. The thorn extractor apparatus of claim 13, wherein the hard, hollow drum comprises a removably attachable soft outer material.

15. The thorn extractor apparatus of claim 11, wherein the removably attachable collection bin comprises a securement mechanism.

* * * * *